UNITED STATES PATENT OFFICE.

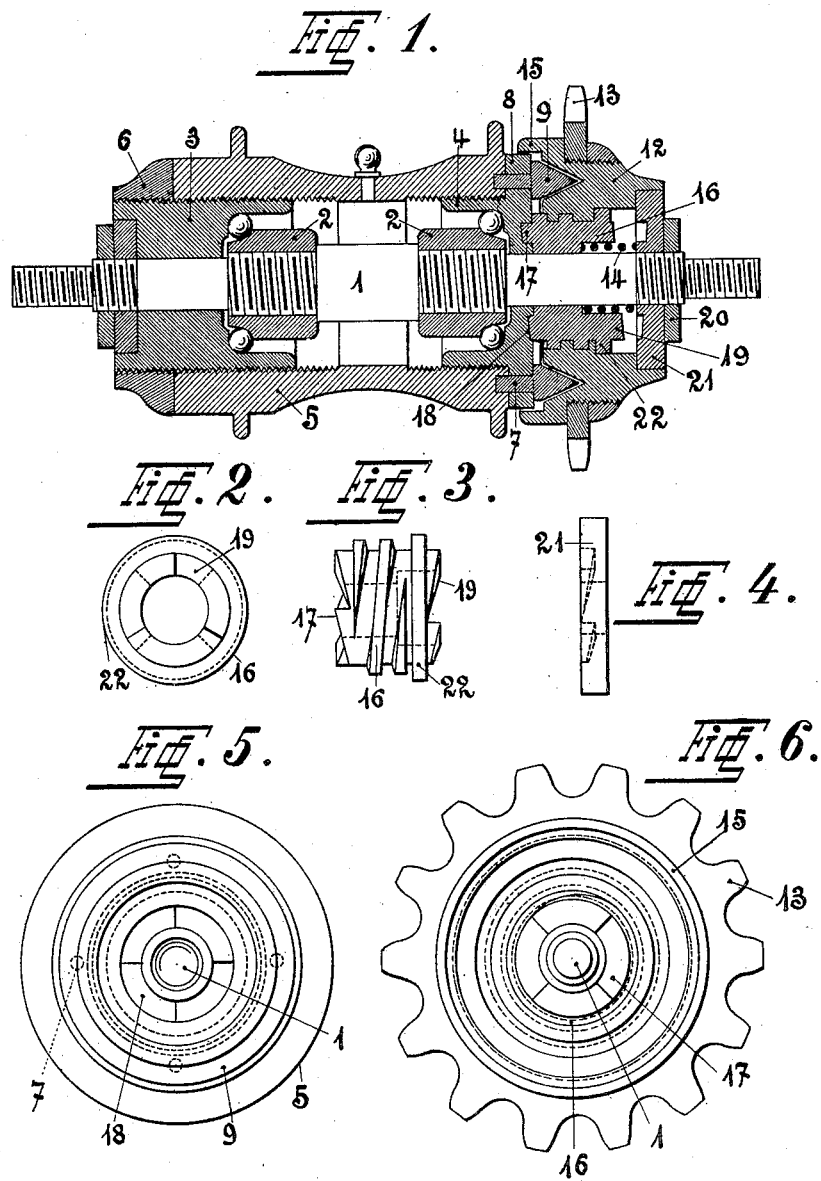

ADAM SCHAAD-VOEGELI, OF OBERHALLAU, SWITZERLAND.

DRIVING MECHANISM FOR VELOCIPEDES.

No. 827,571.  Specification of Letters Patent.  Patented July 31, 1906.

Application filed November 16, 1905. Serial No. 287,684.

*To all whom it may concern:*

Be it known that I, ADAM SCHAAD-VOEGELI, a citizen of the Swiss Republic, residing at Oberhallau, Switzerland, have invented certain new and useful Improvements in Driving Mechanism for Velocipedes, of which the following is a specification.

This invention relates to improvements in driving mechanism for velocipedes with free-wheel clutches and back-pedaling brakes. The driving mechanism of this kind hitherto known has the disadvantage that the operative parts of the clutch and back-pedaling brake are arranged within the hub of the driven wheel and are therefore not easily accessible for repairs and the like. Moreover, the large number of parts comprised by the free-wheel clutch and back-pedaling brake in the constructions hitherto known rendered the disassembling of said parts too difficult to be effected without expert aid.

With the improved mechanism to which the present invention relates the arrangement is such that access to the clutch and brake is obtained in a simple and convenient manner and that the disconnection of the parts, and in some cases the repairing thereof, can be effected without the aid of a skilled mechanician.

One form of the invention is illustrated by way of example in the annexed drawings, in which—

Figure 1 is a longitudinal section of the mechanism. Figs. 2 to 6 illustrate details which will be hereinafter described.

The parts 2, provided with the ball-races, are screwed to the axle 1, which is supported by the frame of the velocipede. The bushes 3 and 4, mounted on the balls, are screwed into the hub 5 of the wheel to be driven, the bush 3 having a right-hand thread and the bush 4 a left-hand thread. A guard-nut 6 for bush 3 and a flange 8 formed on the bush 4 respectively serve to screw said parts 3 and 4 in their adjusted positions. A ring 9, of tough metal and having conical surfaces, is fixed to the flange 8 by means of pins 7. The latter extend through said flange into the hub 5, and thus prevent relative rotation of said flange and hub. The hub 12 of the sprocket-wheel 13 is adapted to coöperate with the ring 9 to produce brake action; but normally said ring is not in contact with the hub 12. A flange 15, formed on the latter, projects over the joint between the flange 8 and ring 9, and thus prevents access of foreign substances to the friction-surfaces of the brake. An internal left-hand thread is cut in the hub 12 for the reception of a corresponding thread formed on a sleeve 16, Figs. 1, 2, and 3, loosely mounted on the shaft 1. Ratchet-teeth 17, formed at the left-hand end of the sleeve 16, engage corresponding teeth 18, formed on the adjacent face of the bush 4, Figs. 1 and 5, and other ratchet-teeth 19, Figs. 1, 2, and 3, at the right-hand end of the sleeve 16 are adapted to engage a locking-disk 21, Figs. 1 and 4, when the said sleeve is displaced toward the right for the purpose of back pedaling, the disk 21 being screwed onto the axle 1 and secured by means of a guard-nut 20. The sleeeve 16 is provided with a collar 22, the purpose of which will be described hereinafter. A spring 14, surrounding the axle 1, tends to keep the sleeve 16 in its left-hand position for forward pedaling. The bearings can also be constructed with a plurality of sets of balls.

The action of the improved mechanism is as follows: During forward pedaling the sleeve 16 is pressed toward the left, Fig. 1, by the internal thread formed on the hub 12 of the sprocket-wheel 13, and the teeth 17 drive the hub 5 through the bush 4. Displacement of the sprocket-wheel 13 toward the right and friction between the said wheel and the non-rotating disk 21 are prevented by the collar 22, which serves as an abutment for the hub 12 and limits the movement of the sprocket-wheel toward the right. When the pedals and the sprocket-wheel cease to revolve and the velocipede is running freely, the hub 5 continues to revolve, and displacement of the sleeve 16 toward the right takes place, so that the said sleeve is disengaged from the bush 4 and caused to engage the disk 21. For applying the brake the pedals and the sprocket-wheel 13 are revolved backward, by which means the hub 12 of the wheel 13 is caused to move toward the left on the sleeve 16, which is coupled with the disk 21. The hub 12 is thus pressed against the brake-ring 9 with an amount of force depending upon the force applied to the pedals. By this means brake action is applied to the hub 5. As soon as the pedals are again caused to revolve in the normal direction the sleeve 16 is disengaged from the disk 21 and caused to again engage the bush 4. For removing the brake-ring 9 when worn out and inserting a new ring it is only necessary to remove the sprocket-wheel 13 and its hub 12.

The improved mechanism described can be applied to existing velocipedes as well as to new ones. Lubrication is effected by means of a hole provided in the hub 5.

It is obvious that the mechanism illustrated can be modified in various ways—for example, by fixing an exchangeable brake-ring to the hub 12, adapted to coöperate with the bush 4 or with a groove in the latter.

What I claim as my invention, and desire to secure by Letters Patent of the United States, is—

1. In driving mechanism for velocipedes the combination of a wheel-hub, a series of clutch-teeth at one end thereof, an interiorly-screw-threaded sprocket-wheel, a series of fixed clutch-teeth, an exteriorly-screw-threaded sleeve within the sprocket-wheel and engaging the latter, and series of clutch-teeth at each end of said sleeve adapted to engage the clutch-teeth on the wheel-hub for forward travel and the series of fixed clutch-teeth for free running substantially as described.

2. In driving mechanism for velocipedes the combination of a wheel-hub, a series of clutch-teeth at one end thereof, an interiorly screw-threaded sprocket-wheel, a series of fixed clutch-teeth, an exteriorly-screw-threaded sleeve within the sprocket-wheel and engaging the latter, series of clutch-teeth at each end of said sleeve adapted to engage the clutch-teeth on the wheel-hub for forward travel and the series of fixed clutch-teeth for free running and a brake-ring between the wheel-hub and sprocket-wheel adapted to be brought into operation on backward rotation of said sprocket-wheel substantially as described.

3. In driving mechanism for velocipedes the combination of a wheel-hub, a series of clutch-teeth at one end thereof, a sprocket-wheel having an interiorly-screw-threaded hub, a fixed disk closing the end of said hub a series of clutch-teeth on the inner surface of said disk, a sleeve located within said sprocket-wheel hub a thread on the exterior of said sleeve engaging the thread in the hub aforesaid series of clutch-teeth at each end of said sleeve adapted to engage the clutch-teeth on the wheel-hub for forward travel and those on the disk for free running and a brake-ring between the wheel-hub and sprocket-wheel adapted to be brought into operation on backward rotation of said sprocket-wheel substantially as described.

4. In driving mechanism for velocipedes the combination of a wheel-hub, a series of clutch-teeth on one end thereof, a sprocket-wheel having an interiorly-screw-threaded hub, a fixed disk closing the end of said hub, a series of clutch-teeth on the inner surface of said disk, a sleeve located within said sprocket-wheel hub, a thread on the exterior of said sleeve engaging the thread in the hub aforesaid, series of clutch-teeth at each end of said sleeve adapted to engage the clutch-teeth on the hub for forward travel and those on the disk for free running, and a brake-ring on the end of the wheel-hub adapted to be engaged by the sprocket-wheel on backward rotation of the latter substantially as described.

5. In driving mechanism for velocipedes the combination of a wheel-hub, a series of clutch-teeth on one end thereof, a sprocket-wheel having an interiorly-screw-threaded hub, a fixed disk closing the end of said hub, a series of clutch-teeth on the inner surface of said disk, a sleeve located within said sprocket-wheel hub, a thread on the exterior of said sleeve engaging the thread in the hub aforesaid, series of clutch-teeth at each end of said sleeve adapted to engage the clutch-teeth on the hub for forward travel and those on the disk for free running, an exchangeable brake-ring on the end of the wheel-hub adapted to be engaged by the sprocket-wheel on backward rotation of the latter, resilient means for normally keeping the sleeve in contact with the wheel-hub and means for preventing friction between the sprocket-wheel hub and fixed disk aforesaid substantially as described.

6. In driving mechanism for velocipedes the combination of a wheel-hub, a series of clutch-teeth on one end thereof, a sprocket-wheel having an interiorly-left-hand-screw-threaded hub, a fixed disk closing the end of said hub, a series of clutch-teeth on the inner surface of said disk, a sleeve located within said sprocket-wheel hub, a left-hand thread on the exterior of said sleeve engaging the thread in the hub aforesaid, series of clutch-teeth at each end of said sleeve adapted to engage the clutch-teeth on the hub for forward travel and those on the disk for free running, an exchangeable brake-ring on the end of the wheel-hub adapted to be engaged by the sprocket-wheel on backward rotation of the latter, a spring between the sleeve and hub, and an abutment on the sleeve for preventing friction between the outer lateral surface of the sprocket-wheel hub and the inner lateral surface of the fixed disk aforesaid, substantially as described.

In witness whereof I have signed this specification in the presence of two witnesses.

ADAM SCHAAD-VOEGELI.

Witnesses:
ADOLF VÖGELI VACHS,
A. LIEBERKNECHT.